United States Patent
Dittmar et al.

(10) Patent No.: US 11,273,927 B2
(45) Date of Patent: Mar. 15, 2022

(54) MICRO-AUXILIARY POWER UNITS

(71) Applicant: HONEYWELL INTERNATIONAL INC., Morris Plains, NJ (US)

(72) Inventors: Kevin S. Dittmar, Phoenix, AZ (US); Jeffrey A. Turner, Chandler, AZ (US); Jonathan Luc Dion, Chandler, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 333 days.

(21) Appl. No.: 16/367,564

(22) Filed: Mar. 28, 2019

(65) Prior Publication Data
US 2019/0308741 A1 Oct. 10, 2019

Related U.S. Application Data

(60) Provisional application No. 62/652,680, filed on Apr. 4, 2018.

(51) Int. Cl.
*B64D 41/00* (2006.01)
*B60H 1/32* (2006.01)
(Continued)

(52) U.S. Cl.
CPC ............... *B64D 41/00* (2013.01); *B60H 1/32* (2013.01); *F01C 20/24* (2013.01); *F01C 21/06* (2013.01);
(Continued)

(58) Field of Classification Search
CPC ..... B64D 41/00; F02D 41/021; F02D 41/042; F02D 41/22; F02D 29/06; B60H 1/32;
(Continued)

(56) References Cited

U.S. PATENT DOCUMENTS

| 5,265,408 A | 11/1993 | Sheoran et al. |
| 6,125,813 A | 10/2000 | Louthan et al. |

(Continued)

FOREIGN PATENT DOCUMENTS

| DE | 102009048719 A1 | 4/2011 |
| EP | 3025965 A1 | 6/2016 |
| EP | 3133266 A1 | 2/2017 |

OTHER PUBLICATIONS

Centek, K.; Auxiliary Power Units; RDECOM; Nov. 17, 2010.
(Continued)

*Primary Examiner* — J. Todd Newton
(74) *Attorney, Agent, or Firm* — Lorenz & Kopf, LLP

(57) ABSTRACT

A micro-auxiliary power unit for supplying electric power to a vehicle includes a thermal resistant enclosure having an intake duct for receiving air, and a source of fuel. A fuel valve is fluidly coupled from the enclosure, and the fuel valve is movable between an opened position and a closed position. The micro-auxiliary power unit includes a Wankel engine to drive an output shaft and a starter-generator coupled to the output shaft to generate electric power. The micro-auxiliary power unit includes a system that has at least one sensor disposed within the enclosure that observes a condition of the enclosure and generates sensor signals, and a controller having a processor that receives the sensor signals, determines the presence of a thermal event within the enclosure and based on the determination, outputs one or more control signals to the fuel valve to move the fuel valve to the closed position.

20 Claims, 5 Drawing Sheets

(51) Int. Cl.

| | |
|---|---|
| *F01C 20/24* | (2006.01) |
| *F02B 63/04* | (2006.01) |
| *F02D 41/22* | (2006.01) |
| *F01C 21/06* | (2006.01) |
| *F02C 5/06* | (2006.01) |
| *F02C 7/26* | (2006.01) |
| *F02C 7/36* | (2006.01) |
| *F02N 11/08* | (2006.01) |
| *F02D 41/02* | (2006.01) |
| *F02D 41/04* | (2006.01) |
| *F02D 29/06* | (2006.01) |
| *F02B 53/00* | (2006.01) |

(52) U.S. Cl.
CPC ............... *F02B 63/04* (2013.01); *F02C 5/06* (2013.01); *F02C 7/26* (2013.01); *F02C 7/36* (2013.01); *F02D 29/06* (2013.01); *F02D 41/021* (2013.01); *F02D 41/042* (2013.01); *F02D 41/22* (2013.01); *F02N 11/0859* (2013.01); *F02B 2053/005* (2013.01); *F05B 2260/20* (2013.01); *F05B 2260/40* (2013.01); *F05D 2220/50* (2013.01); *F05D 2220/76* (2013.01)

(58) Field of Classification Search
CPC .......... F01C 20/24; F01C 21/06; F02B 63/04; F02B 2053/005; F02B 2260/20; F02B 2260/40; F02B 2220/50; F02B 2220/76; F02N 11/0859
USPC ........................................ 244/53 R
See application file for complete search history.

(56) References Cited

U.S. PATENT DOCUMENTS

| | | | |
|---|---|---|---|
| 7,291,932 B2 | 11/2007 | Wurtele et al. | |
| 7,654,087 B2 | 2/2010 | Ullyott | |
| 8,015,795 B2 | 9/2011 | Schwarz et al. | |
| 8,742,605 B1 | 6/2014 | Wilhide et al. | |
| 9,759,126 B2 | 9/2017 | Julien | |
| 2006/0032974 A1* | 2/2006 | Williams | B64D 41/00 244/58 |
| 2006/0218934 A1* | 10/2006 | Williams | F02C 7/045 60/785 |
| 2009/0263259 A1 | 10/2009 | Picton et al. | |
| 2011/0197849 A1* | 8/2011 | Wright | F01C 1/22 123/241 |
| 2013/0214091 A1 | 8/2013 | Hillel | |
| 2015/0017044 A1 | 1/2015 | Steinwandel et al. | |
| 2015/0349356 A1* | 12/2015 | Ribarov | B64D 41/00 290/1 A |
| 2016/0185461 A1* | 6/2016 | Beuning | B64D 41/00 244/58 |
| 2016/0348788 A1 | 12/2016 | Lemmers, Jr. et al. | |
| 2016/0376981 A1 | 12/2016 | Ullyott et al. | |
| 2017/0037774 A1 | 2/2017 | Jones et al. | |
| 2018/0283283 A1* | 10/2018 | Manoukian | F02C 7/25 |
| 2019/0126082 A1* | 5/2019 | Wright | A62C 33/00 |

OTHER PUBLICATIONS

PATS unveils lightweight rotary-engine APU for corporate jets; Oct. 22, 1997.
US-Auxiliary Units; Retrieved from Internet: [http://rwebs.net/avhistory/images/wix/US_Aux_Engines_1944.pdf] 1944.

* cited by examiner

MICRO-AUXILIARY POWER UNITS

CROSS-REFERENCE TO RELATED APPLICATION

This application claims the benefit of U.S. Provisional Application No. 62/652,680, filed on Apr. 4, 2018, which is incorporated herein by reference.

TECHNICAL FIELD

The present disclosure generally relates to power systems, and more particularly relates to micro-auxiliary power units.

BACKGROUND

Certain vehicles may have a need for an additional power unit, or auxiliary power unit, during certain operating scenarios associated with the particular vehicle. In the example of an aircraft, during flight, aircraft main engines not only provide propulsion for the aircraft, but in many instances may also be used to drive various other rotating components such as, for example, generators, compressors, and pumps, to thereby supply electrical, pneumatic, and/or hydraulic power. However, when an aircraft is on the ground, the main engines may not be operating. Moreover, in some instances the main engines may not be capable of supplying power. Thus, many aircraft include one or more auxiliary power units to supplement the main propulsion engines in providing electrical and/or pneumatic power.

Generally, in the example of the vehicle as an aircraft, an auxiliary power unit is a gas turbine engine that includes a combustor, a power turbine, and a compressor. These auxiliary power units are relatively too bulky, heavy, and complex for anything other than large vehicle or large aircraft applications. Thus, smaller size vehicles or smaller size aircraft may have to rely on batteries, which have limited power output and may be unreliable, or external ground-based power supplies, which may be unavailable at rural airports.

Accordingly, it is desirable to provide improved power systems for use with small applications, such as small aircraft. It is desirable to provide these improved power systems such that power is supplied in a reliable manner, and in a quantity greater than that available by other sources, such as batteries. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a micro-auxiliary power unit for supplying electric power to a vehicle. The micro-auxiliary power unit includes a thermal resistant enclosure having an intake duct for receiving air, and a source of fuel onboard the vehicle. The source of fuel is fluidly coupled to the enclosure via a fuel line, with a fuel valve fluidly coupled to the fuel line upstream from the enclosure, and the fuel valve is movable between a first, opened position in which fuel flows through the fuel line and a second, closed position in which the flow of fuel is inhibited. The micro-auxiliary power unit includes a Wankel engine contained wholly within the enclosure. The engine is configured to combust the air and the fuel to drive an output shaft. The micro-auxiliary power unit includes a starter-generator coupled to the output shaft of the engine and disposed wholly within the enclosure. The starter-generator is configured to generate electric power for the vehicle based on the rotation of the output shaft. The micro-auxiliary power unit includes a detection and suppression system coupled to the enclosure. The detection and suppression system has at least one sensor disposed within the enclosure that observes a condition of the enclosure and generates sensor signals based thereon, and a controller having a processor configured to: receive the sensor signals; determine, based on the sensor signals, the presence of a thermal event within the enclosure; and based on the determination of the presence of the thermal event, output one or more control signals to the fuel valve to move the fuel valve to the second, closed position.

Based on the determination of the presence of the thermal event, the processor is further configured to output one or more control signals to a suppressant valve to supply a suppressant agent into the enclosure to extinguish the thermal event. The condition observed by the at least one sensor is at least one of a presence of smoke and a temperature within the enclosure. The enclosure defines a fire zone for the micro-auxiliary power unit. The micro-auxiliary power unit further comprises a cooling system disposed within the enclosure. The cooling system includes a cooling fan coupled to the output shaft, a coolant pump for circulating coolant fluid and a radiator fluidly coupled to the intake duct and to the coolant pump, and the cooling fan, coolant pump and the radiator contained wholly within the enclosure. The micro-auxiliary power unit further comprises an exhaust duct coupled to the engine to receive combustion products. The exhaust duct is fluidly coupled to a muffler disposed within the enclosure, and the muffler is fluidly coupled to an enclosure exhaust duct to exhaust the combustion products from the engine external to the enclosure. The micro-auxiliary power unit further comprises a lubrication system fluidly coupled to the engine. The lubrication system includes a lubrication tank and a lubrication pump disposed wholly within the enclosure. The vehicle is an aircraft, the source of fuel is an aircraft fuel tank and the starter-generator is configured to supply the electrical power to one or more electrical loads of the aircraft. The micro-auxiliary power unit further comprises a mounting structure fixedly coupled to the vehicle. The mounting structure is configured to receive the micro-auxiliary power unit for electrically and fluidly coupling the micro-auxiliary power unit to the vehicle. The micro-auxiliary power unit further comprises a fuel filter and a fuel pump fluidly coupled to the source of fuel downstream from the fuel valve, and the fuel filter and the fuel pump contained wholly within the enclosure. The micro-auxiliary power unit further comprises a battery pack configured to supply electrical power to the starter-generator to start the engine, the battery pack contained wholly within the enclosure. The enclosure includes at least one mount for removably coupling the enclosure to the vehicle, and the engine is mounted within the enclosure by at least one engine mount. The source of fuel is a source of jet fuel. The enclosure includes an interface for electrically coupling the electric power generated by the starter-generator to one or more electrical loads of the vehicle. The enclosure includes an interface configured to receive one or more control signals from an engine controller associated with the vehicle.

Further provided is a micro-auxiliary power unit for supplying electric power to an aircraft. The micro-auxiliary power unit includes a thermal resistant enclosure having an intake duct for receiving air, and the enclosure defines a fire zone for the micro-auxiliary power unit. The micro-auxiliary power unit includes a source of fuel onboard the aircraft. The source of fuel is fluidly coupled to the enclosure via a fuel line, with a fuel valve fluidly coupled to the fuel line upstream from the enclosure, and the fuel valve is movable between a first, opened position in which fuel flows through the fuel line and a second, closed position in which the flow of fuel is inhibited. The micro-auxiliary power unit includes a Wankel engine contained wholly within the enclosure. The engine is configured to combust the air and the fuel to drive an output shaft. The micro-auxiliary power unit includes a starter-generator coupled to the output shaft of the engine and disposed wholly within the enclosure. The starter-generator is configured to generate electric power for one or more electrical loads of the aircraft based on the rotation of the output shaft. The micro-auxiliary power unit includes a detection and suppression system coupled to the enclosure. The detection and suppression system has at least one sensor disposed within the enclosure that observes at least one of a presence of smoke and a temperature within the enclosure and generates sensor signals based thereon, and a controller having a processor configured to: receive the sensor signals; determine, based on the sensor signals, the presence of a thermal event within the enclosure; based on the determination of the presence of the thermal event, output one or more control signals to the fuel valve to move the fuel valve to the second, closed position; and based on the determination of the presence of the thermal event, output one or more control signals to a suppressant valve to supply a suppressant agent into the enclosure to extinguish the thermal event.

The micro-auxiliary power unit further comprises a cooling system disposed within the enclosure. The cooling system includes a cooling fan coupled to the output shaft, a coolant pump for circulating coolant fluid and a radiator fluidly coupled to the intake duct and to the coolant pump, and the cooling fan, coolant pump and the radiator contained wholly within the enclosure. The micro-auxiliary power unit includes a lubrication system fluidly coupled to the engine. The lubrication system includes a lubrication tank and a lubrication pump disposed wholly within the enclosure. The micro-auxiliary power unit further comprises an exhaust duct coupled to the engine to receive combustion products. The exhaust duct is fluidly coupled to a muffler disposed within the enclosure, and the muffler is fluidly coupled to an enclosure exhaust duct to exhaust the combustion products from the engine external to the enclosure. The micro-auxiliary power unit further comprises a mounting structure fixedly coupled to the vehicle. The mounting structure is configured to receive the micro-auxiliary power unit for electrically and fluidly coupling the micro-auxiliary power unit to the vehicle. The micro-auxiliary power unit further comprises a fuel filter and a fuel pump fluidly coupled to the source of fuel downstream from the fuel valve, the fuel filter and the fuel pump contained wholly within the enclosure and a battery pack configured to supply electrical power to the starter-generator to start the engine, the battery pack contained wholly within the enclosure.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
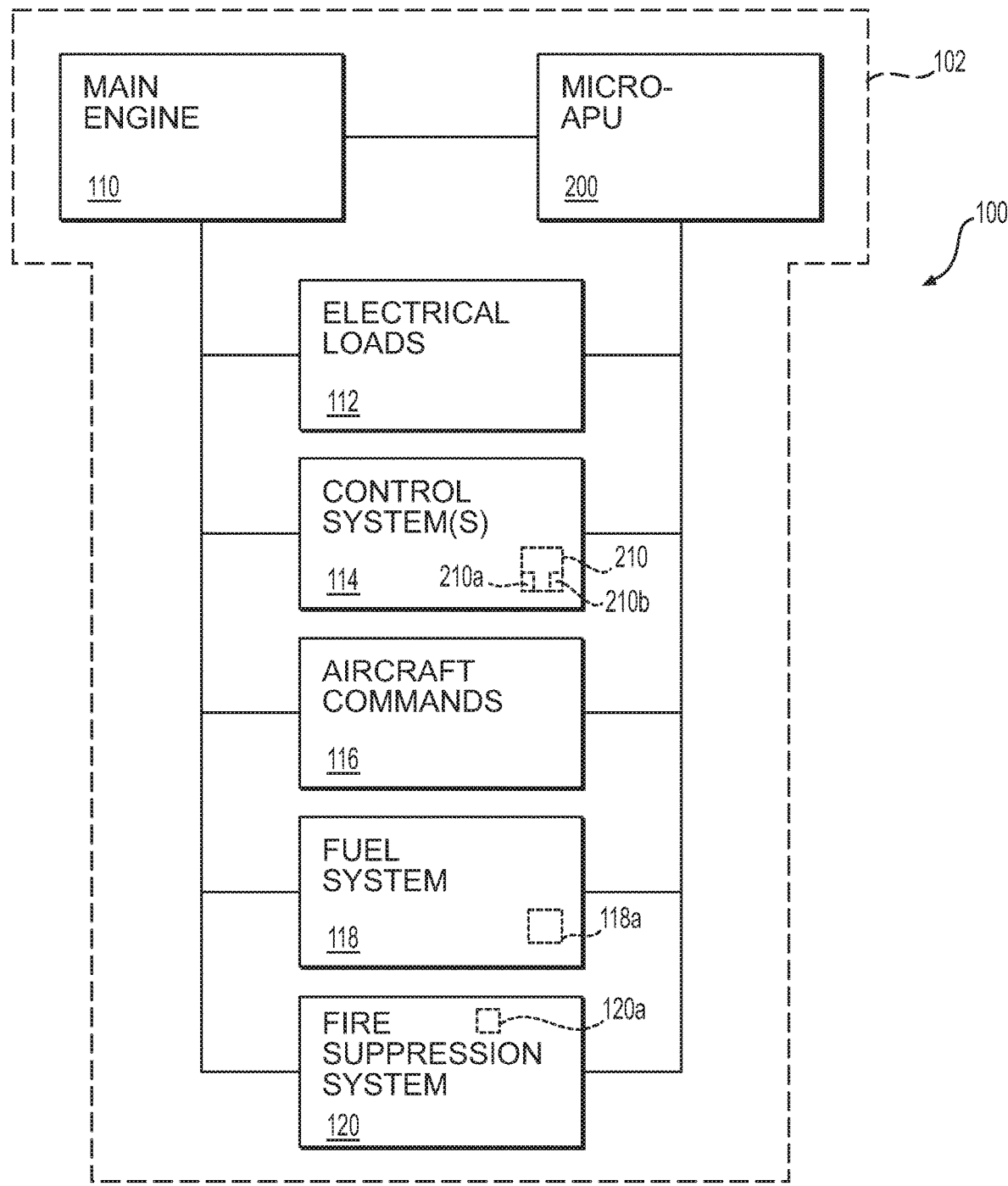
FIG. 1 is a functional block diagram of a system for a vehicle, which in this example is an aircraft, in accordance with various embodiments of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of vehicle or application that would benefit from having an micro-auxiliary power unit, and the application of the micro-auxiliary power unit to a small aircraft, such as a business jet, turboprop aircraft, small helicopter or mid-size helicopter, is merely one exemplary embodiment according to the present disclosure. In addition, while the micro-auxiliary power unit is described herein as being used onboard a vehicle, such as a bus, motorcycle, train, motor vehicle, marine vessel, business jet, turboprop aircraft, small helicopter or mid-size helicopter and the like, the various teachings of the present disclosure can be used to provide auxiliary power on a stationary platform. For example, the micro-auxiliary power unit may be employed with applications may include aerospace (small jets and turboprops; charter companies; fractional companies; corporate fleets; and special mission aircraft). Other applications include military vehicles (e.g., M1 Tank, Joint Light Tactical Vehicle, Paladin, etc.); mobile command posts; mobile medical facilities; and emergency response. Ground vehicles applications include tracked vehicles and artillery pieces. Military ground power equipment applications include command posts, remote power supplies, medical units, and integrated aircraft systems. Portable power systems applications include remote power generation systems and rapid deployment power systems. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the micro-auxiliary power unit described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel.

FIG. 1 is a functional block diagram of an aircraft system 100 onboard an aircraft 102. In this simplified example, the aircraft system 100 includes a main engine 110, a micro-auxiliary power unit 200, electrical loads 112, control systems 114, and a source of aircraft commands 116. The aircraft 102 also includes a fuel system 118 and a fire suppression system 120. As will be discussed, the micro-auxiliary power unit 200 is removably coupled to a support structure associated with the aircraft 102 so as to be replaceable, if needed, or serviced. The incorporation of the micro-auxiliary power unit 200 onboard the aircraft 102 enables the generation of power for use by the electrical loads 112 and by the main engine 110. As discussed further herein, the micro-auxiliary power unit 200 is coupled to the aircraft 102 so as to be in communication with one or more of the electrical loads 112, the control systems 114, the source of aircraft commands 116, the fuel system 118 and the fire suppression system 120 through couplings that enable the removal and replacement of the micro-auxiliary power unit 200, if needed.

Generally, the main engine 110 is configured to generate mechanical power for propulsion of the aircraft 102 and, in many instances, may also be used to drive various rotating components such as, for example, generators, compressors, and pumps, to thereby supply electrical, pneumatic, and/or hydraulic power. In one exemplary embodiment, the main engine 110 is a gas turbine engine. As such and although not shown, the main engine 110 typically includes a compressor system, a combustion system, a turbine system, and an exhaust system that function to generate power during flight, as generally recognized. However, when the aircraft 102 is on the ground, its main engine 110 may not be operating and/or capable of supplying power. In these instances, the micro-auxiliary power unit 200 may be utilized to supply power to various aircraft systems, as discussed below. The aircraft 102 may be any type of aircraft with an engine, such as a fixed-wing aircraft, a rotary-wing aircraft, and a jet aircraft.

Generally, the electrical loads 112 correspond to any aircraft electrical system or device that generates, transmits, distributes, utilizes, and/or stores electrical energy. For example, the electrical loads may include an electric starter, lights, electric flight instruments, navigation aids, and radios. At least one distribution bus (not shown) is provided in the aircraft 102 to power individual components of the electrical loads 112. Although not shown, the aircraft system 100 may also include pneumatic loads that utilize pressurized fluid or air from the main engine 110 and/or from a pump powered by the main engine 110 and/or the micro-auxiliary power unit 200. The pneumatic loads correspond to any aircraft system or device that is generally powered by compressed air or compressed inert gases, such as brakes, compressors, actuators, pressure sensors, pressure switches, pressure regulators, and the like.

Figure 2:
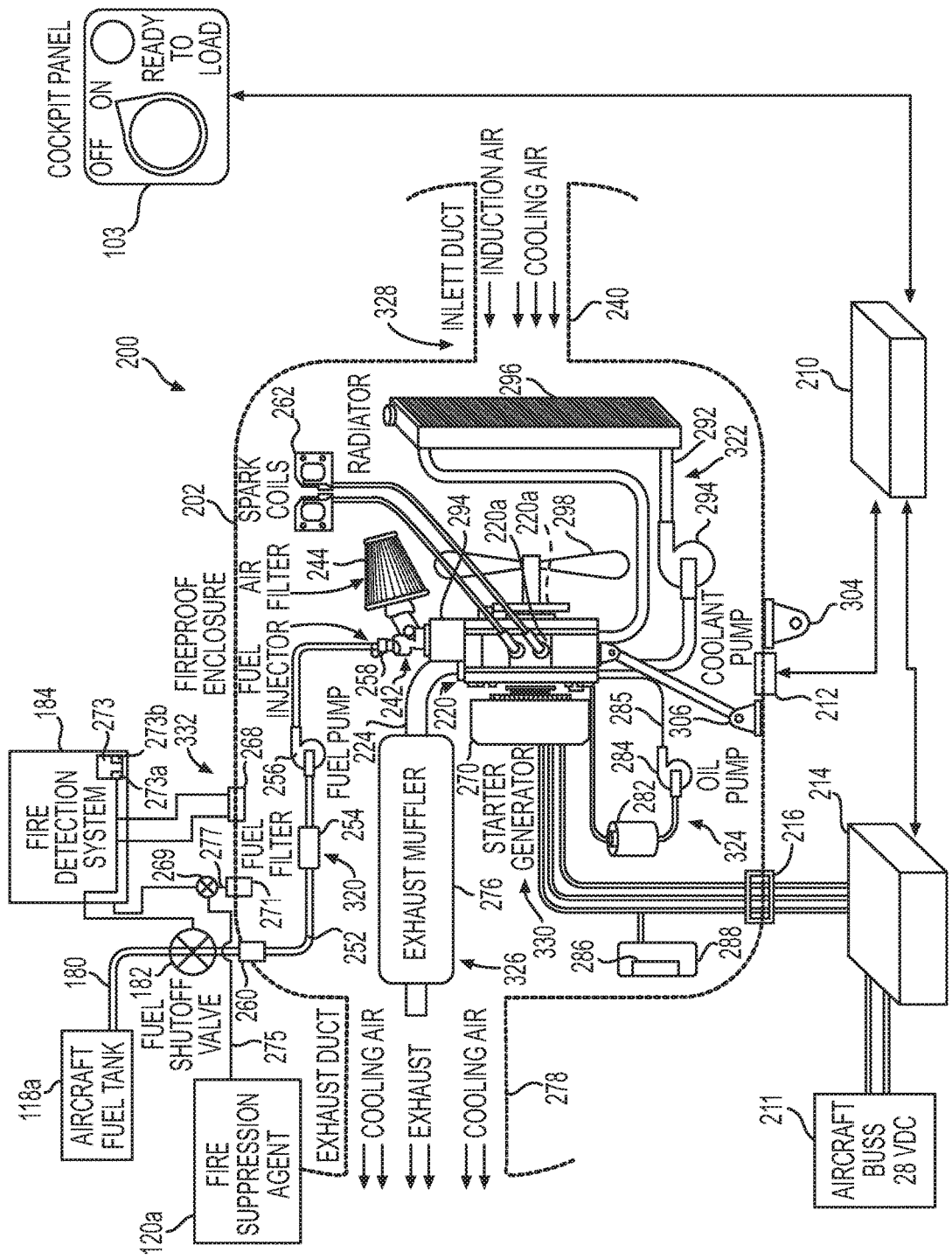
FIG. 2 is a schematic representation of a micro-auxiliary power unit according to an exemplary embodiment of the present disclosure.

In this example, and with brief reference to FIG. 2, control systems 114 may be operatively connected to the electrical loads 112 for selectively allocating the electrical loads 112 between the main engine 110 and the micro-auxiliary power unit 200. The control systems 114 may include any system for control of the aircraft 102, such as a flight management system (FMS), an air management system, an aircraft management controller (AMC), an aircraft digital computer system, and the like. In some embodiments, various information is transmitted from one aircraft control system to another, such as flight mode or regime (i.e. take-off, climb, cruise, descent, taxi, etc.) and other aircraft operating parameters (i.e. pressure, temperature, speed, etc.). The control systems 114 are also connected to the source of aircraft commands 116, which may include primary controls such as a control yoke, a center stick or side stick, rudder pedals, and throttle controls, and/or secondary controls, for receiving from the aircraft command control signals for control of the aircraft 102.

The control systems 114 may also include engine control systems, which may include any engine controlling devices such as an engine control unit (ECU), an engine electronic controller (EEC), an engine electronic control system, and a Full Authority Digital Engine Controller (FADEC). The control systems 114 may be configured for starting and shutting down, as well as for effecting other control operations, of the main engine 110 and the micro-auxiliary power unit 200. In one example, the control systems 114 includes an engine controller 210, which is in communication with one or more components of the micro-auxiliary power unit 200 to control the operation of one or more components associated with the micro-auxiliary power unit 200.

In one example, and with brief reference to FIG. 2, the engine controller 210 is an engine control unit associated with the control systems 114 of the aircraft 102 and is located outside of the enclosure 202. In other embodiments, the engine controller 210 may be integrated with the micro-auxiliary power unit 200 inside the enclosure 202. Depending on the embodiment, the engine controller 210 may be implemented or realized with a general purpose processor 210a, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the engine controller 210 includes processing logic that may be configured to carry out the functions, techniques, and processing tasks associated with the operation of the micro-auxiliary power unit 200 described in greater detail below. Furthermore, the steps of a method or algorithm described in connection with the embodiments disclosed herein may be embodied directly in hardware, in firmware, in a software module executed by the engine controller 210, or in any practical combination thereof. In accordance with one or more embodiments, the engine controller 210 includes or otherwise accesses a data storage element or media 210b, such as a memory (e.g., RAM memory, ROM memory, flash memory, registers, a hard disk, or the like) or another suitable non-transitory short or long term storage media capable of storing computer-executable programming instructions or other data for execution that, when read and executed by the processor 210a of the engine controller 210, cause the processor 210a to execute and perform one or more of the processes, tasks, operations, and/or functions described herein.

The engine controller 210 may generate commands to the micro-auxiliary power unit 200 based on user input from a user interface 103, which may be implemented in the cockpit, and/or by another aircraft system. The user interface 103 may be implemented as a keyboard (not separately shown), a microphone (not separately shown), a touchscreen layer associated with a display, a touch pen, a number pad, a mouse, a touchpad, a roller ball, a pushbutton, a switch, a joystick, a knob, a digital notepad or other suitable device to receive data and/or commands from the user. The input received from the user interface 103 is communicated to the engine controller 210 over a suitable communication architecture that facilitates the transfer of data, power, commands, etc., such as a bus associated with the aircraft 102.

Similarly, the engine controller 210 may communicate with the components for the micro-auxiliary power unit 200 in any suitable manner. The engine controller 210 may be electrically coupled to the micro-auxiliary power unit 200 via a command or signal interface 212. The signal interface 212 may be electrically coupled to the various components of the micro-auxiliary power unit 200 in any suitable manner, such as a wired connection, bus, etc. In this manner, the engine controller 210 may generate commands or control signals to control one or more of the components of the micro-auxiliary power unit 200 discussed below, and/or the engine controller 210 may receive data or signals from the signal interface 212, such as feedback or sensor data. It should be noted that for clarity, the various lines interconnecting the components of the micro-auxiliary power unit 200 and the signal interface 212 that enable communication between the components of the micro-auxiliary power unit 200 and the engine controller 210 via the signal interface 212 are not shown in detail herein.

With reference back to FIG. 1, the fuel system 118 is fluidly coupled to the main engine 110 and the micro-auxiliary power unit 200 to supply fuel to the main engine 110 and to the micro-auxiliary power unit 200. The fuel system 118 is fluidly coupled to the main engine 110 and the micro-auxiliary power unit 200 via a respective one or more conduits, such as hoses, etc. The fuel system 118 may include one or more fuel tanks 118a. In one example, the fuel tanks 118a comprise one or more of the wing mounted fuel tanks and/or center tanks associated with the aircraft 102. The fuel tanks 118a are fillable with and store a suitable fuel for use by the main engine 110. In this example, the fuel tanks 118a are filled with and store kerosene and kerosene blends. Exemplary kerosene and kerosene blends include, but are not limited to, Jet A, Jet A-1 and Jet B. It should be noted that in other embodiments, the fuel system 118 may include a separate fuel tank for supplying fuel to the micro-auxiliary power unit 200, if desired. For example, in certain embodiments, the micro-auxiliary power unit 200 may have multi-fuel capability, e.g., is capable of running of multiple fuels without adjustments, including jet fuel (unleaded kerosene or a naphtha-kerosene blend), aviation gasoline, bio-fuels, diesel, gasoline, and the like.

The fire suppression system 120 is fluidly coupled to at least the micro-auxiliary power unit 200 to provide the micro-auxiliary power unit 200 with a fire suppressing agent. The fire suppression system 120 is fluidly coupled to the micro-auxiliary power unit 200 via a respective one or more conduits, such as hoses, etc. In one example, the fire suppression system 120 includes at least one storage tank 120a. The storage tank 120a is fillable with and stores a suitable fire suppressing agent, including, but not limited to halon, recycled halon, FM-200® (HFC-227ea), Halotron I (HCFC Blend B), Halotron II, FE-36™ (HFC-236fa), etc. It should be noted that in other embodiments, the fuel system 118 may include a separate storage tank for supplying a fire suppressing agent to the micro-auxiliary power unit 200, if desired.

As will be discussed herein, the micro-auxiliary power unit 200 is a non-turbine electric-only auxiliary power unit (APU) for aircraft applications and other applications. The micro-auxiliary power unit 200 operates to generate electric power for use by one or more systems of the aircraft 102. In one example, the micro-auxiliary power unit 200 is a purely integrated, self-contained auxiliary power system that is packaged within a thermal containment enclosure 202. The micro-auxiliary power unit 200 may include an integrated acoustics control system, integrated controls and generator control, and simplified installation, such as requirements for only basic external connections. In one example, the micro-auxiliary power unit 200 associated with the aircraft 102 may be removed and replaced in about 30 minutes. The micro-auxiliary power unit 200 enables existing aircraft 102 the ability to reduce their battery requirements on the aircraft 102. The micro-auxiliary power unit 200 has an installed weight of less than about 100 pounds (lbs.), or less than about 75 lbs. In some examples, the micro-auxiliary power unit 200 provides main engine 110 (FIG. 1) start assist by providing main engine starting assistance to a battery associated with the aircraft 102, such as about 300 amps, as well as battery charging capability to insure batteries onboard the aircraft 102 are at full charge. The micro-auxiliary power unit 200 provides power to run all ground functions on the aircraft 102 including: air conditioning systems, internal lighting systems, flight deck functions, cabin entertainment, and functionality for the passengers, as examples. The micro-auxiliary power unit 200 further provides low cost electronic voltage regulation through voltage chasing technology, along with engine control and generator control functions fully integrated within the enclosure 202.

FIG. 2 is a schematic block diagram of a micro-auxiliary power unit 200 in accordance with an exemplary embodiment. A substantial majority of the components of the micro-auxiliary power unit 200 may be housed in the thermal containment enclosure 202. The enclosure 202 may provide an integrated "package" for the micro-auxiliary power unit 200 and operates as a fire or thermal containment housing. In one embodiment, the enclosure 202 is fireproof and forms a fire zone for the micro-auxiliary power unit 200. The enclosure 202 is formed from any suitable fireproof or fire-resistant materials, including, but not limited to stainless steel, nickel-base alloys, or titanium-base alloys that meet appropriate thermal resistance standards, as well as fiber reinforced plastic composites such as glass/epoxy, graphite/phenolic that meet appropriate thermal resistance standards, etc. The enclosure 202 may be formed by any suitable technique, including, but not limited to, casting, stamping, extruding, forging, machining, composite ply lay-up, additive manufacturing, etc. In addition, the enclosure 202 may also include other structures or devices to improve the fire resistance, such as appropriate seals, partitions, and the like. Although depicted as a unitary and integral structure, it will be appreciated that the enclosure 202 may be formed with sections to enable access to the components contained within the enclosure 202, if desired. It should be noted that while the enclosure 202 is shown as a rectangular housing, the enclosure 202 may have any shape that enables the enclosure 202 to be coupled to the aircraft 102.

Figure 3:
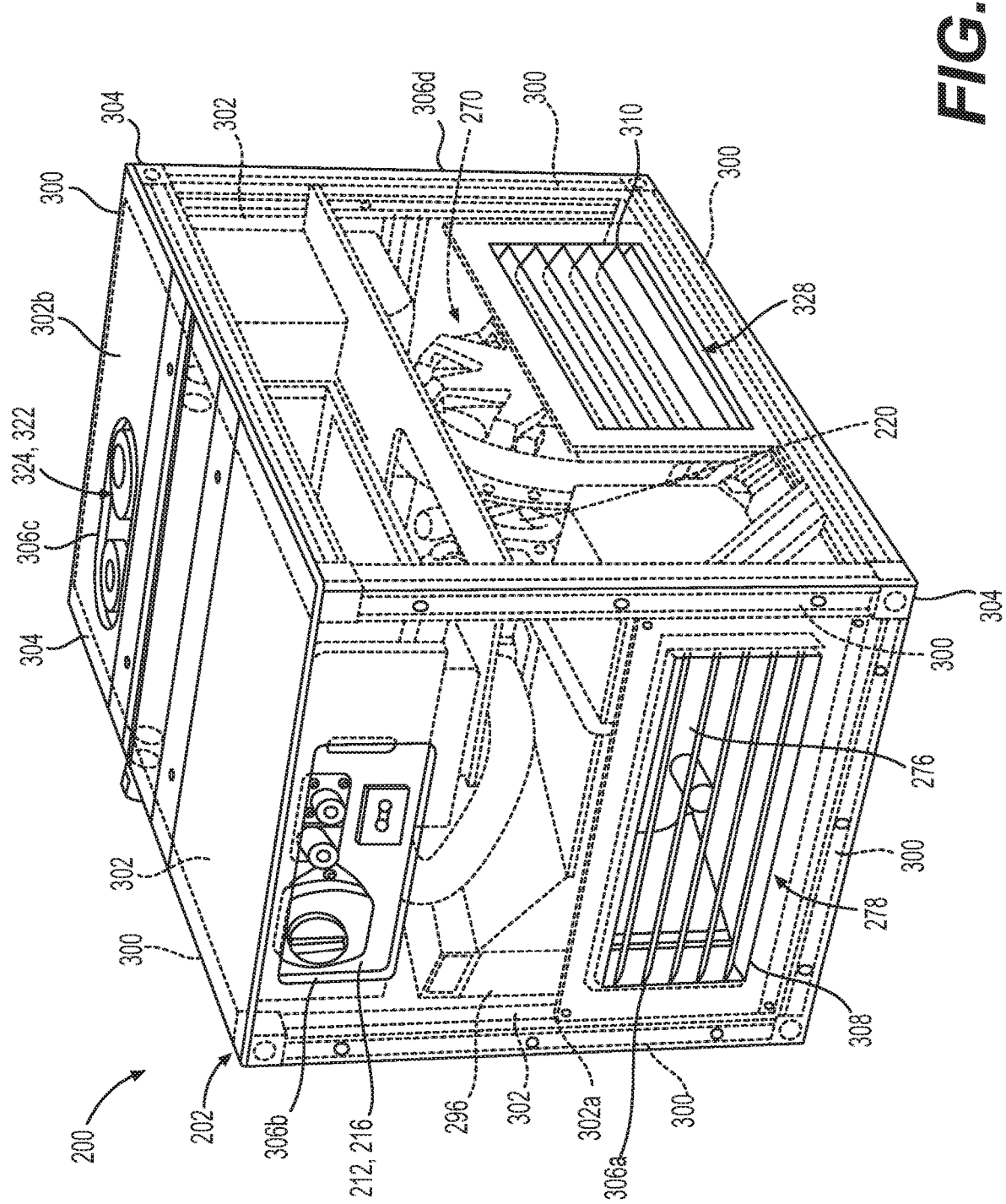
FIG. 3 is a perspective view of a physical implementation of the micro-auxiliary power unit of FIG. 2 according to an exemplary embodiment.

In one example, with reference to FIG. 3, the enclosure 202 includes a plurality of frame members 300 and a plurality of walls or panels 302. FIG. 3 is a perspective view of a physical implementation of the micro-auxiliary power unit 200 of FIG. 2 according to an exemplary embodiment. As shown, the enclosure 202 is generally box-shaped and depicted in FIG. 3 with the frame members 300 and other components of the micro-auxiliary power unit 200 in phantom. The plurality of frame members 300 cooperate to define a rectangular structure, which surrounds the micro-auxiliary power unit 200. In this example, the frame members 300 are composed of a metal or metal alloy, including, but not limited to stainless steel, nickel-base alloys, or titanium-base alloys that meet the appropriate thermal resistance standards. The frame members 300 may be cast, extruded, forged, machined, fabricated through additive manufacturing, etc. The frame members 300 may be interconnected at their distal ends via brackets 304, and one or more thermal resistant mechanical fasteners may be used to interconnect the frame members 300, via the brackets 304 at the distal ends to form the rectangular structure. The frame members 300 may be hollow or solid. If hollow, the frame members 300 may be filled with fire retardant materials, if desired. The frame members 300 may define one or more openings that are spaced apart to receive one or more thermal resistant fasteners to couple the panels 302 to the frame members 300. In this example, the panels 302 are composed of fiber reinforced plastic composites such as glass/epoxy, graphite/phenolic, etc., which is molded, however, the panels 302 may be composed of stainless steel, nickel-base alloys, or titanium-base alloys, which may be cast, forged, machined, stamped, etc. Each of the panels 302 may include one or more bores proximate a perimeter of the panel 302 to receive a suitable mechanical fastener for coupling the respective panel 302 to the respective frame members 300. Typically, the panels 302 are opaque or solid, however, in certain embodiments, they may be semi-transparent or transparent.

In certain instances, one or more of the panels 302 may include openings or cut-outs 306 or other features to enable the micro-auxiliary power unit 200 to be coupled to the electrical loads 112, control systems 114, fuel system 118 and fire suppression system 120 of the aircraft 102. For example, one of the panels 302a includes cut-outs 306a and 306b. The cut-out 306a enables an exhaust muffler 276 to be vented external to the enclosure 202. In this example, a ventilation cover 308 is coupled over the cut-out 306a, however, the cut-out 306a may be configured for coupling a duct to the exhaust muffler 276. The cut-out 306b enables a power management unit 208 to be coupled to the micro-auxiliary power unit 200. One of the panels 302b includes a cut-out 306c, which provides access to a unit lubrication system 324 and a unit cooling system 322 associated with the micro-auxiliary power unit 200. One of the panels 302c includes a cut-out 306d, which enables fluid communication external to the micro-auxiliary power unit 200 for a radiator 296 associated with the micro-auxiliary power unit 200. In this example, a ventilation cover 310 is coupled over the cut-out 306d, however, the cut-out 306c may be configured for coupling with a duct to supply fluid to the radiator 296. The ventilation cover 310 may include a plurality of openings, which enable a flow of fluid, such as exhaust, to exit the enclosure 202.

With reference back to FIG. 2, the micro-auxiliary power unit 200 includes a unit fuel system 320, a unit cooling system 322, a unit lubrication system 324, a unit exhaust system 326, a unit intake system 328, a unit power system 330 and a unit fire detection and suppression system 332. Each of the unit fuel system 320, the unit cooling system 322, the unit lubrication system 324, the unit exhaust system 326, the unit intake system 328, the unit power system 330 and the unit fire detection and suppression system 332 are contained substantially within the enclosure 202, and are coupled to the electrical loads 112, control systems 114, fuel system 118, fire suppression system 120 and main engine 110 of the aircraft 102.

The unit fuel system 320 supplies fuel from the fuel system 118 of the aircraft 102 to the unit power system 330. In one example, the unit fuel system 320 includes a fuel shut-off valve 182, a fuel line 252, a fuel filter 254, a fuel pump 256, at least one fuel injector 258 and a fuel line interface 260. The fuel shut-off valve 182 is fluidly coupled between the fuel tanks 118a of the aircraft 102 and the fuel line interface 260. In one example, the fuel shut-off valve 182 is fluidly coupled to an aircraft fuel line 180, which in turn is fluidly coupled to the fuel tanks 118a. In some examples, the aircraft fuel line 180 may include a fuel shut-off valve 182, which may receive shut-off commands from the unit fire detection and suppression system 332, discussed below. The fuel shut-off valve 182 is responsive to one or more control signals received from the engine controller 210 via the signal interface 212 and/or one or more control signals received from the unit fire detection and suppression system 332 to move the fuel shut-off valve 182 from a first, opened position to a second, closed position. Thus, in one example, the fuel shut-off valve 182 is an electrically actuated one-way valve. In the first, opened position fuel flows from the fuel tanks 118a into the fuel line 252, and in the second, closed position, fuel is inhibited from flowing into the fuel line 252 and the enclosure 202. Generally, the fuel shut-off valve 182 is coupled to the fuel tanks 118a of the aircraft 102 so as to be downstream from the fuel tanks 118a and upstream from the fuel line interface 260. Stated another way, the fuel shut-off valve 182 is positioned outside of the enclosure 202, which enables the unit fire detection and suppression system 332 to inhibit the flow of fuel into the enclosure 202 in case a thermal event is detected. This further ensures that the thermal event may be contained within the enclosure 202.

The fuel line 252 is fluidly coupled between the fuel line interface 260 and the fuel filter 254. The fuel line 252 is any suitable conduit for suppling fuel from the fuel line interface 260 to the fuel filter 254, such as a flexible hose, rigid hose, or other conduit. The fuel filter 254 is contained wholly within the enclosure 202 and receives the fuel from the fuel tanks 118a via the fuel line 252 when the fuel shut-off valve 182 is in the first, opened position. The fuel filter 254 comprises a suitable fuel filter for the type of fuel contained in the fuel tanks 118a. In one example, the fuel filter 254 includes media that removes contaminates from the fuel, including, but not limited to, water, ultra-fine solids, etc. The fuel filter 254 is fluidly coupled to the fuel pump 256.

The fuel pump 256 is downstream of the fuel filter 254, and is fluidly coupled to the fuel filter 254 via a suitable conduit, tubing, hose, etc. The fuel pump 256 draws the fuel from the fuel tanks 118a (when the fuel shut-off valve 182 is in the first, opened position), through the fuel line 252 and the fuel filter 254 and delivers the fuel to the fuel injector 258. The fuel pump 256 may comprise an electric fuel pump, which may be coupled to the engine controller 210 via the signal interface 212 to receive one or more control signals to control the operation of the fuel pump 256.

The fuel injector 258 injects the fuel received from the fuel tanks 118a, via the fuel pump 256, to a rotary engine 220 contained wholly within the enclosure 202. The fuel injector 258 is downstream from the fuel pump 256. The fuel injector 258 is in communication with the engine controller 210 via the signal interface 212 to receive one or more control signals to inject the fuel into the rotary engine 220. The fuel injector 258 is a suitable fuel injector for injecting fuel of the type contained in the fuel tanks 118a, as is generally known.

The fuel line interface 260 fluidly couples the fuel line 252 to the fuel shut-off valve 182 and the fuel tanks 118a. The fuel line interface 260 may comprise a quick disconnect coupling, or other suitable coupling for fluidly coupling the fuel line 252 to a fuel line downstream of and in fluid communication with the fuel shut-off valve 182. The fuel line interface 260 enables the fuel from the aircraft 102 to be quickly and easily fluidly coupled to the micro-auxiliary power unit 200. Thus, the unit fuel system 320 enables fluid communication between the fuel tanks 118a of the fuel system 118 of the aircraft 102 and the micro-auxiliary power unit 200.

The unit cooling system 322 provides cooling to the micro-auxiliary power unit 200. In one example, the unit cooling system 322 includes a cooling circuit 292, a coolant pump 294, a radiator 296 and a cooling fan 298. The cooling circuit 292 comprises one or more hoses, conduits, tubing, etc. for circulating coolant through portions of the rotary engine 220 and the radiator 296. The coolant is any type of cooling media, including, but not limited to, water, oil, glycol, etc. The coolant pump 294 circulates the coolant through the cooling circuit 292, which includes portions of the rotary engine 220. The coolant receives heat in the rotary engine 220, is cooled by cooling air passing through the radiator 296, and returns to the rotary engine 220. The coolant pump 294 is any suitable pump for circulating the coolant, as is generally known. In one example, the coolant pump 294 may comprise an electric pump, which may be coupled to the engine controller 210 via the signal interface 212 to receive one or more control signals to control the operation of the coolant pump 294. The radiator 296 is positioned within the enclosure 202 and is in fluid communication with the unit intake system 328 to receive cooling air. The radiator 296 may comprise any suitable type of heat exchanger, and thus, the use of a radiator is merely an example. The cooling fan 298 may facilitate cooling air flow through the unit intake system 328 and through the radiator 296. In one example, the cooling fan 298 is driven by an output shaft 220a of the rotary engine 220. The cooling fan 298 draws cooling air in from the unit intake system 328, which is used to cool the fluid passing through the radiator 296.

The unit lubrication system 324 circulates a lubricant through one or more components of the rotary engine 220. The lubricant includes, but is not limited to, oil. In one example, the unit lubrication system 324 includes a lubricant source or oil tank 282 and a lubricant pump or oil pump 284. In this example, the oil tank 282 is disposed wholly within the enclosure 202, however, in other embodiments, lubricant for the unit lubrication system 324 may be received from a lubrication source onboard the aircraft 102, via one or more conduits that are fluidly coupled to the oil pump 284. The oil pump 284 is fluidly coupled to the oil tank 282, and draws the lubricant from the oil tank 282. The oil pump 284 is also fluidly coupled to a lubrication circuit 285, and circulates the lubricant from the oil tank 282 through one or more components of the rotary engine 220. The oil pump 284 may comprise an electric pump, which may be coupled to the engine controller 210 via the signal interface 212 to receive one or more control signals to control the operation of the oil pump 284. The lubrication circuit 285 includes one or more conduits, hoses, tubing, etc. which supply the lubricant to the rotary engine 220, and receive the oil from the rotary engine 220.

The unit exhaust system 326 includes an outlet conduit 274, an exhaust muffler 276 and an enclosure exhaust duct 278. The outlet conduit 274 is coupled to the rotary engine 220 to receive combustion products or exhaust flow generated by the rotary engine 220. The outlet conduit 274 is fluidly coupled to the exhaust muffler 276. The exhaust muffler 276 is downstream from the rotary engine 220, and attenuates the noise associated with the rotary engine 220. The exhaust muffler 276 is illustrated as a cylindrical tube, however, the exhaust muffler 276 may have any desired shape and configuration to reduce noise generated by the rotary engine 220. The exhaust muffler 276 is fluidly coupled to the enclosure exhaust duct 278. The enclosure exhaust duct 278 directs the combustion products or exhaust flow from the exhaust muffler 276 out of the enclosure 202.

In one example, the enclosure exhaust duct 278 is the ventilation cover 310, as shown in FIG. 3, however, the enclosure exhaust duct 278 may comprise a tubular or cylindrical duct, which extends beyond the enclosure 202 and may be fluidly coupled to an exhaust duct associated with the aircraft 102, an ambient environment surrounding the aircraft 102, etc.

The unit intake system 328 provides intake air into the enclosure 202. In one example, the unit intake system 328 includes an inlet 240. The inlet 240 is fluidly coupled to the ambient environment external to the enclosure 202 to receive air. In one example, the inlet 240 comprises an inlet duct, which extends beyond a perimeter of the enclosure 202 as shown schematically in FIG. 2, and in other embodiments, the inlet 240 may comprise a ventilation cover, similar to the ventilation cover 310, which is coupled to a cut-out defined in one of the panels 302 (FIG. 3). The inlet 240 is fluidly upstream from the radiator 296 such that air from the inlet 240, which is generally at a lower temperature than the air within the enclosure 202, may be drawn, by the cooling fan 298, through the radiator 296 to cool the fluid within the radiator 296.

In one example, the unit power system 330 includes a starter-generator controller 214, the rotary engine 220, a starter-generator 270 and a battery pack 286. In one example, the starter-generator controller 214 is electrically coupled to an interface 216 to receive the electric power generated by the micro-auxiliary power unit 200. The starter-generator controller 214 may distribute the electric power as appropriate, e.g., via an aircraft bus 211. In this example, the starter-generator controller 214 is positioned external to the enclosure 202, and may be in communication with the interface 216 via a suitable wired connection. In other embodiments, the starter-generator controller 214 may be disposed within the enclosure 202, and the enclosure 202 may include a coupling device for electrically coupling the starter-generator controller 214 to the aircraft bus 211.

In some embodiments, the engine controller 210 and the starter-generator controller 214 may be integrated into a single controller and/or be distributed across additional control components. The engine controller 210 and/or the starter-generator controller 214 may each be integrated into the control systems 114 discussed above with reference to FIG. 1 and/or be separate controller. The starter-generator controller 214 may receive operational commands or control signals from the engine controller 210, the user interface 103, and/or other aircraft systems and is in communication with the engine controller 210, the user interface 103, and/or other aircraft systems over a suitable architecture that enables the transfer of power, data and/or commands, such as a bus.

The rotary engine 220 is operable to generate torque, which drives the starter-generator 270 to generate electric power or energy that is output to the starter-generator controller 214. In one example, the rotary engine 220 is a Wankel engine, which is a type of internal combustion engine using an eccentric rotary design to convert pressure into rotating motion, and will be described below as such, although other engine types are possible. Generally, the rotary engine 220 is configured to combust a fuel and air mixture to generate a rotary movement, which is used to generate electrical power. In one example, the rotary engine 220 includes a throttle body 242, an air filter 244 and a heater 248.

The throttle body 242 receives the air from the inlet 240 of the unit intake system 328. The throttle body 242 is responsive to one or more control signals received from the engine controller 210 via the signal interface 212 to control an amount of air that enters into the rotary engine 220. The throttle body 242 may comprise any suitable throttle body 242 for use with a Wankel engine. The air filter 244 may be upstream from the throttle body 242 in the flow direction of the air through the inlet 240. The air filter 244 removes fine particles and other contaminants from the air flow prior to the air flow entering the throttle body 242.

The rotary engine 220 also receives fuel from the unit fuel system 320. During operation, the fuel pump 256 pumps fuel through the fuel line 252, which is filtered by fuel filter 254 and injected into the rotary engine 220 by the fuel injector 258. In one example, the fuel injector 258 may operate based on commands or one or more control signals received from the engine controller 210 via the signal interface 212.

In addition, the rotary engine 220 may include the heater 248. The heater 248 may heat or warm one or more liquids or components within the micro-auxiliary power unit 200, including the fuel prior to the fuel being supplied to the rotary engine 220. For example, the heater 248 may comprise a fuel line heater, which heats the fuel prior to the fuel entering the rotary engine 220. In other embodiments, the heater 248 may comprise a fuel filter heater, which heats the fluid as it passes through the fuel filter 254. The heater 248 may be controlled by one or more control signals received from the engine controller 210 via the signal interface 212.

The rotary engine 220 also includes one or more spark coils 262. The air from the throttle body 242 and the fuel from the fuel injector 258 is mixed within the rotary engine 220 and ignited by sparks produced by one or more spark coils 262. The one or more spark coils 262 may be in communication with the engine controller 210 via the signal interface 212 to receive one or more commands or control signals to control the ignition of the mixture of air and fuel. Generally, the one or more spark coils 262 generate an electric spark to ignite the fuel, and the resulting combustion drives a rotor of the rotary engine 220. The rotor, in turn, drives the output shaft 220a. One end of the output shaft 220a is coupled to the starter-generator 270 to drive the starter-generator 270, and the other end of the output shaft 220a is coupled to the cooling fan 298. As the operation of the Wankel engine and the Wankel engine is generally known, further details regarding the operation of the rotary engine 220 will not be discussed in detail herein. It should be noted, however, that the Wankel engine may deliver multiple advantages over a reciprocating piston or turbine engine, such as simplicity, smoothness, compactness, high revolutions per minute, and a high power-to-weight ratio primarily because three power pulses per rotor revolution are produced compared to one per revolution in a two-stroke piston engine and one per two revolutions in a four-stroke piston engine, although at the actual output shaft, there is only one power pulse per revolution.

The starter-generator 270 receives the rotary power from the rotary engine 220 and generates electric power. The starter-generator 270 is electrically coupled to the interface 216, which may be electrically coupled to the starter-generator controller 214 that distributes the electric power to the aircraft bus 211. In one example, the starter-generator 270 is configured to be selectively operated in either a starter (or motor) mode or a generator mode. In the starter mode, the starter-generator 270 receives electrical power from the battery pack 286 housed in a battery casing 288, which causes the starter-generator 270 to rotate and supply mechanical output power to, for example, the rotary engine 220. In the generator mode, the starter-generator 270 receives mechanical input power from, for example, the output shaft of the rotary engine 220, and in response, the starter-generator 270 rotates to generate the electric power. In addition to the various types of physical configurations, it will be further appreciated that the starter-generator 270 may be configured to implement any one of numerous types of motor/generators including, for example, permanent magnet, induction, and switched reluctance type motor/generators. In one example, the starter-generator 270 may be a very light weight permanent magnet alternator with solid state power electronics and 28 volts (V) per 400 amps (A) output, which is greater electric power output than that provided by batteries onboard an aircraft that does not include an auxiliary power unit.

The battery pack 286 supplies power to the starter-generator 270 to start the rotary engine 220. The battery pack 286 is contained within the battery casing 288, which in this example, is contained wholly within the enclosure 202. The battery pack 286 contains one or more batteries, which are operable to provide power to start the starter-generator 270. The battery pack 286 may be rechargeable. In certain embodiments, the battery pack 286 may be recharged by the starter-generator 270. The battery pack 286 is in communication with the starter-generator 270 via a suitable communication architecture that facilitates the transfer of power, such as a bus. The battery casing 288 is any suitable housing for the battery pack 286, and may facilitate coupling the battery pack 286 within the enclosure 202.

In one example, the unit fire detection and suppression system 332 includes one or more sensors 268, a suppressant valve 269, a suppressant supply interface 271 and a detection and suppression controller 273. The one or more sensors 268 observe conditions within the enclosure 202 and generate sensor signals based on the observations. In one example, the one or more sensors 268 observe a temperature within the enclosure 202, a presence of smoke within the enclosure, or other thermal event characteristics. For example, one of the sensors 268 is a smoke detector, and one of the sensors 268 is a temperature sensor. The sensors 268 are in communication with the detection and suppression controller 273 over a suitable communication architecture that enables the transfer of power, data and commands, such as a bus.

The suppressant valve 269 is fluidly coupled between the storage tank 120a that stores the fire suppressant agent and the enclosure 202. In certain embodiments, the suppressant valve 269 may be coupled to one of the panels 302 (FIG. 3), and thus, the location of the suppressant valve 269 in FIG. 2 is merely an example. One or more conduits 275, 277 may fluidly couple the storage tank 120a to the suppressant valve 269, and fluidly couple the suppressant valve 269 to the enclosure 202. The suppressant valve 269 is responsive to one or more control signals received from the detection and suppression controller 273 to move the suppressant valve 269 from a first, closed position to a second, opened position. Thus, in one example, the suppressant valve 269 is an electrically actuated one-way valve. In the second, opened position the fire suppression agent flows from the storage tank 120a into the conduit 275, and in the first, closed position, the fire suppression agent is inhibited from flowing into the conduit 277 and the enclosure 202. Generally, the suppressant valve 269 is coupled to the storage tank 120a of the aircraft 102 so as to be downstream from the storage tank 120a.

The suppressant supply interface 271 fluidly couples the conduit 277 to the enclosure 202. The suppressant supply interface 271 may comprise a quick disconnect coupling, or other suitable coupling for fluidly coupling the conduit 277 to the enclosure 202. The suppressant supply interface 271 enables the fire suppression agent from the aircraft 102 to be quickly and easily fluidly coupled to the micro-auxiliary power unit 200.

The detection and suppression controller 273 is located outside of the enclosure 202. In other embodiments, the detection and suppression controller 273 may be integrated with the micro-auxiliary power unit 200 inside the enclosure 202. Depending on the embodiment, the detection and suppression controller 273 may be implemented or realized with a general purpose processor 273a, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the detection and suppression controller 273 includes processing logic that may be configured to carry out the functions, techniques, and processing tasks associated with the detection and suppression of a thermal event described in greater detail below. Furthermore, the steps of a method or algorithm described in connection with the embodiments disclosed herein may be embodied directly in hardware, in firmware, in a software module executed by the detection and suppression controller 273, or in any practical combination thereof. In accordance with one or more embodiments, the detection and suppression controller 273 includes or otherwise accesses a data storage element or media 273b, such as a memory (e.g., RAM memory, ROM memory, flash memory, registers, a hard disk, or the like) or another suitable non-transitory short or long term storage media capable of storing computer-executable programming instructions or other data for execution that, when read and executed by the processor 273a of the detection and suppression controller 273, cause the processor 273a to execute and perform one or more of the processes, tasks, operations, and/or functions described herein.

The processor 273a of the detection and suppression controller 273 receives as input the sensor signals from the sensors 268. The processor 273a of the detection and suppression controller 273 determines, based on the sensor signals, whether a thermal event or fire is detected within the enclosure 202. For example, based on the sensor signals observing smoke in the enclosure 202 (from a smoke detector), the processor 273a of the detection and suppression controller 273 determines the presence of a thermal event or fire within the enclosure 202. As a further example, based on the sensor signals observing a temperature in the enclosure 202 (from a temperature sensor), the processor 273a of the detection and suppression controller 273 may compare the temperature from the sensor signals to a predefined or known threshold temperature (such as a temperature associated with a thermal event within the enclosure 202) and determine the presence of a thermal event or fire within the enclosure 202.

Based on the determination of the presence of a thermal event, the processor 273a of the detection and suppression controller 273 outputs one or more control signals to the fuel shut-off valve 182 to move the fuel shut-off valve 182 from the first, opened position to the second, closed position; and the processor 273a of the detection and suppression controller 273 outputs one or more control signals to the suppressant valve 269 to move the suppressant valve 269 from the first, closed position to the second, opened position. Thus, the processor 273a of the detection and suppression controller 273 controls the operation of the fuel shut-off valve 182 and the suppressant valve 269 based on the determination of the presence of a thermal event or fire. With the fuel shut-off valve 182 in the second, closed position, fuel is unable to flow from the fuel tanks 118*a* into the enclosure, and when the suppressant valve 269 is in the second, opened position, the fire suppression agent flows from the storage tank 120*a* into the enclosure 202 to extinguish the detected thermal event. Thus, the unit fire detection and suppression system 332 detects a thermal event within the micro-auxiliary power unit 200, the enclosure 202 contains the thermal event, and the unit fire detection and suppression system 332 extinguishes the thermal event.

In some embodiments, the detection and suppression controller 273, the engine controller 210 and the starter-generator controller 214 may be integrated into a single controller and/or be distributed across additional control components. The detection and suppression controller 273, the engine controller 210 and/or the starter-generator controller 214 may each be integrated into the control systems 114 discussed above with reference to FIG. 1 and/or be separate controller.

The micro-auxiliary power unit 200 may be installed in any suitable location within the aircraft 102. In one example, the enclosure 202 may be provided with one or more suitable enclosure mounts 304 to mount the micro-auxiliary power unit 200 as a unitary structure. Within the enclosure 202, engine mounts 306 may be provided to support the rotary engine 220, as well as other components. The mounts 304, 306 may also provide vibration isolation.

FIG. 3 is a perspective view of a physical implementation of the micro-auxiliary power unit 200 of FIG. 2 according to an exemplary embodiment. As shown in FIG. 3, the rotary engine 220 and the starter-generator 270 are arranged wholly within the enclosure 202. Other components depicted in FIG. 3 include the unit intake system 328, the radiator 296, the enclosure exhaust duct 278, the exhaust muffler 276, aspects of the lubricant and/or coolant systems 280, 290, and the interfaces 212, 216 provided to transfer power and signals in and/or out of the micro-auxiliary power unit 200. In the example of FIG. 3, the micro-auxiliary power unit 200 may be approximately 1.0 foot high by 1.0 foot wide by 2.0 feet deep or approximately 15 inches high by 15 inches wide by 22 inches deep, as examples.

Figure 7:
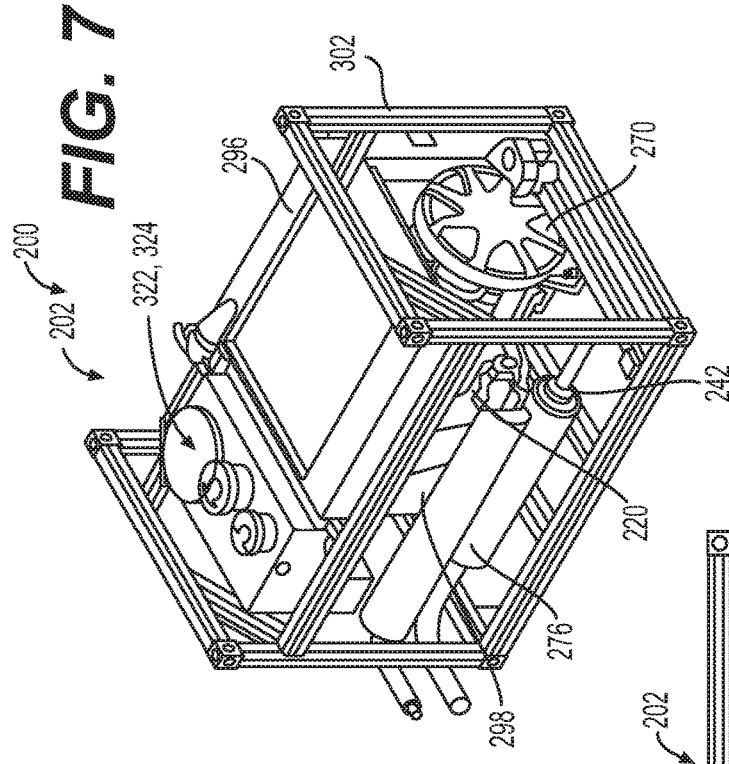
FIG. 7 is a perspective view of the micro-auxiliary power unit of FIG. 4.
Figure 6:
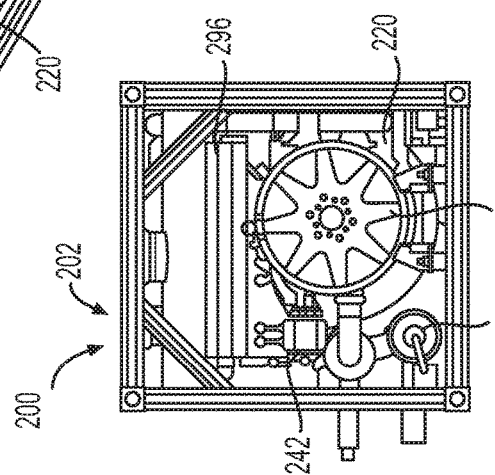
FIG. 6 is an end view of the micro-auxiliary power unit of FIG. 4.
Figure 4:
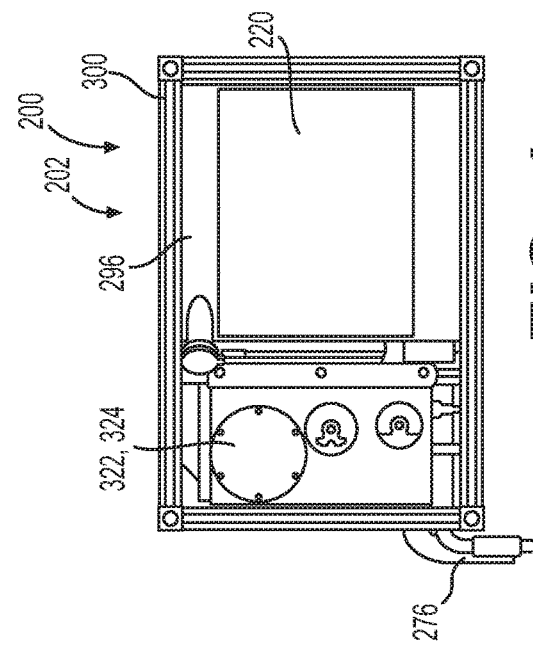
FIG. 4 is a top view of a physical implementation of a micro-auxiliary power unit according to another exemplary embodiment.
Figure 5:
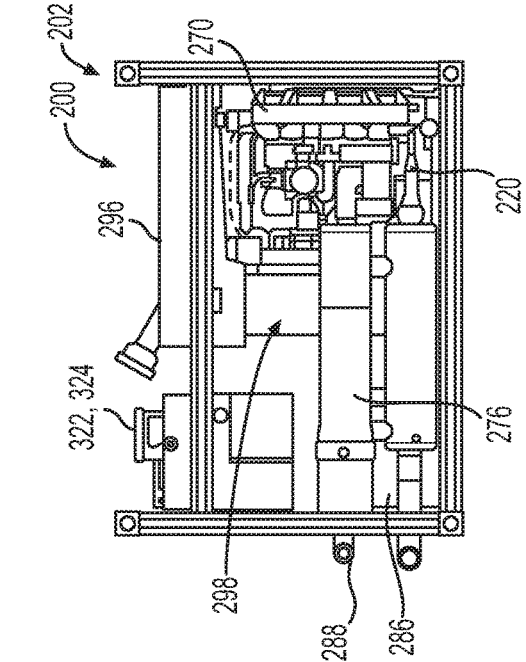
FIG. 5 is a side view of the micro-auxiliary power unit of FIG. 4.

Example characteristics of the arrangement and function of micro-auxiliary power unit 200 have been described, although micro-auxiliary power unit 200 may take any one of numerous physical configurations. For example, with reference to FIGS. 4-7, the micro-auxiliary power unit 200 discussed with regard to FIGS. 1-3 is shown with components and/or systems of the micro-auxiliary power unit 200 arranged in different orientations to provide a reduced size for the enclosure 202 of the micro-auxiliary power unit 200. In the example of FIGS. 4-7, the micro-auxiliary power unit 200 is about 22 inches long, is about 15 inches wide is about 16 inches tall, and weighs about 50 lbs. In FIGS. 4-7, the panels 302 (FIG. 3) are removed for clarity. As shown in FIG. 4, the radiator 296 is positioned over the rotary engine 220 to reduce a height of the micro-auxiliary power unit 200. With reference to FIG. 5, the rotary engine 220 and the starter-generator 270 are positioned such that the exhaust muffler 276 extends along a length of the enclosure 202. FIG. 6 is an end view of the micro-auxiliary power unit 200. In FIG. 6, the starter-generator 270 is orientated to a side of the enclosure 202, which provides space within the enclosure 202 for the throttle body 242. With reference to FIG. 7, the unit cooling system 322 and the unit lubrication system 324 are positioned adjacent to the radiator 296, and the cooling fan 298 is positioned below the radiator 296 (see also FIG. 5). Thus, the various components and/or systems of the micro-auxiliary power unit 200 may be positioned in alternative locations to reduce a size of the enclosure 202 to enable the micro-auxiliary power unit 200 to be used with a variety of differently sized aircraft.

With reference back to FIGS. 2 and 3, the micro-auxiliary power unit 200 can be assembled and coupled to the aircraft 102. In one example, with the frame members 300 formed, the frame members 300 may be assembled together, via the brackets 304 and mechanical fasteners, to define the rectangular structure. With reference to FIG. 2, the rotary engine 220, with the throttle body 242, the air filter 244, the fuel injector 258 and the heater 248 coupled to the rotary engine 220, may be positioned in within the rectangular structure defined by the frame members 300. The fuel line 252, the fuel filter 254 and the fuel pump 256 are coupled to the rotary engine 220, and the fuel line interface 260 is coupled to the fuel line 252. The outlet conduit 274 and the exhaust muffler 276 are coupled to the rotary engine 220, and positioned within the rectangular structure. The starter-generator 270 is coupled to the output shaft 220*a* of the rotary engine 220, and the cooling fan 298 is coupled to the other side of the output shaft 220*a*. The battery pack 286 is coupled to the battery casing 288 and electrically coupled to the starter-generator 270. The starter-generator 270 is electrically coupled to the interface 216. The unit cooling system 322 and the unit lubrication system 324 are coupled to the rotary engine 220 and are positioned within the rectangular structure. The fuel pump 256, the fuel injector 258, the throttle body 242, the spark coils 262, the oil pump 287 and the coolant pump 294 are electrically coupled to the signal interface 212. The sensors 268 are coupled within the rectangular structure. The panels 302 are coupled to the rectangular structure defined by the frame members 300 to form the enclosure 202, and the suppressant supply interface 271 is coupled to the enclosure 202. The fuel line interface 260 is coupled to the enclosure 202.

With the micro-auxiliary power unit 200 assembled, the micro-auxiliary power unit 200 is coupled to the aircraft 102. The micro-auxiliary power unit 200 is coupled to the aircraft 102 to enable fluid communication between the fuel line interface 260 and the fuel tanks 118*a* (FIG. 1); and fluid communication between the storage tank 120*a* and the suppressant supply interface 271. The micro-auxiliary power unit 200 is coupled to the aircraft 102 to enable electrical communication between the starter-generator controller 214, the engine controller 210 and the detection and suppression controller 273. The micro-auxiliary power unit 200 may be coupled to the aircraft 102 through any suitable technique, including, through the use of an aircraft mounting structure, such as a mounting structure 700 discussed below with regard to FIG. 8.

Example characteristics of the arrangement and function of micro-auxiliary power unit 200 have been described, although micro-auxiliary power unit 200 may take any one of numerous physical configurations. For example, with reference to FIG. 8, a micro-auxiliary power unit 500 is shown. As the micro-auxiliary power unit 500 includes the same or substantially similar components as the micro-auxiliary power unit 200 discussed with regard to FIGS. 1-3, the same reference numerals with be used to denote the same components. The micro-auxiliary power unit 500 is a non-turbine electric-only auxiliary power unit (APU) for aircraft applications and other applications. The micro-auxiliary power unit 500 operates to generate electric power for use by one or more systems of the aircraft 102. In one example, the micro-auxiliary power unit 500 is a purely integrated, self-contained auxiliary power system that is packaged within a thermal containment enclosure 502. The micro-auxiliary power unit 500 may include an integrated acoustics control system, integrated controls and generator control, and simplified installation, such as requirements for only basic external connections. In this example, as will be discussed, the micro-auxiliary power unit 500 is coupled to the aircraft 102 via the mounting structure 700. Generally, the micro-auxiliary power unit 500 is configured to "plug in" to the mounting structure 700 such that most of the interfaces connect substantially automatically to provide ease of installation. The micro-auxiliary power unit 500 associated with the aircraft 102 may be removed and replaced in about 30 minutes.

A substantial majority of the components of the micro-auxiliary power unit 500 may be housed in the thermal containment enclosure 502. The enclosure 202 may provide an integrated "package" for the micro-auxiliary power unit 500 and operates as a thermal or fire containment housing. In one embodiment, the enclosure 502 is fireproof and forms a fire zone for the micro-auxiliary power unit 500. The enclosure 502 is formed from any suitable fireproof or fire-resistant materials, including, but not limited to stainless steel, nickel-base alloys, or titanium-base alloys that meet appropriate thermal resistance standards, as well as fiber reinforced plastic composites such as glass/epoxy, graphite/phenolic, etc. The enclosure 502 may be formed by any suitable technique, including, but not limited to, casting, stamping, extruding, forging, machining, composite ply lay-up, additive manufacturing, etc. In addition, the enclosure 502 may also include other structures or devices to improve the fire resistance, such as appropriate seals, partitions, and the like. Although depicted as a unitary and integral structure, it will be appreciated that the enclosure 502 may be formed with sections to enable access to the components contained within the enclosure 502, if desired. It should be noted that while the enclosure 502 is shown as a rectangular housing, the enclosure 502 may have any shape that enables the enclosure 502 to be coupled to the aircraft 102. Although not shown herein, the enclosure 502 may include the frame members 300 and the panels 302.

The micro-auxiliary power unit 500 includes a unit fuel system 520, the unit cooling system 322, the unit lubrication system 324, a unit exhaust system 526, a unit intake system 528, a unit power system 530 and a unit fire detection and suppression system 532. Each of the unit fuel system 520, the unit cooling system 322, the unit lubrication system 324, the unit exhaust system 526, the unit intake system 528, the unit power system 530 and the unit fire detection and suppression system 532 are substantially contained within the enclosure 502, and are coupled to the electrical loads 112, control systems 114, fuel system 118, fire suppression system 120 and main engine 110 of the aircraft 102. Similarly, the engine controller 210 (FIGS. 1 and 2) may communicate with the components for the micro-auxiliary power unit 500 in any suitable manner. The engine controller 210 may be electrically coupled to the micro-auxiliary power unit 500 via a command or signal interface 708 of the mounting structure 700, which in turn is connected to a command or signal interface 512 of the micro-auxiliary power unit 500. The signal interface 512 may be electrically coupled to the various components of the micro-auxiliary power unit 500 in any suitable manner, such as a bus. In this manner, the engine controller 210 may generate commands or control signals to control one or more of the components of the micro-auxiliary power unit 500, via the electrical connection between the signal interface 708 and the signal interface 512, and/or the engine controller 210 may receive data or signals from the signal interface 512, such as feedback or sensor data.

The unit fuel system 520 supplies fuel from the fuel system 118 of the aircraft 102 (FIG. 1) to the unit power system 530. In one example, the unit fuel system 520 includes the fuel shut-off valve 182, the fuel line 252, the fuel filter 254, the fuel pump 256, the at least one fuel injector 258 and a fuel line interface 560. For simplicity, the fuel line 252, the fuel filter 254, the fuel pump 256 and the at least one fuel injector 258, contained within the enclosure 502, are not numbered in FIG. 8. Further, for simplicity, as the fuel shut-off valve 182 is the same as that shown in FIG. 2, the fuel shut-off valve 182 is not shown in FIG. 8. In this example, the fuel line interface 560 fluidly couples the fuel line 252 (within the enclosure 502) to the fuel shut-off valve 182 and the fuel tanks 118*a* (FIG. 2). The fuel line interface 560 may comprise a quick disconnect coupling, or other suitable coupling for fluidly coupling the fuel line 252 to a fuel line downstream of and in fluid communication with the fuel shut-off valve 182 (FIG. 2). The fuel line interface 560 enables the fuel from the aircraft 102 to be quickly and easily fluidly coupled to the micro-auxiliary power unit 500. The unit fuel system 520 enables fluid communication between the fuel tanks 118*a* of the fuel system 118 of the aircraft 102 and the micro-auxiliary power unit 500.

As discussed with regard to FIG. 2, the unit cooling system 322 provides cooling to the micro-auxiliary power unit 200. The unit cooling system 322 includes the cooling circuit 292, the coolant pump 294 and the cooling fan 298, which for simplicity, are not shown in FIG. 8. The unit lubrication system 324 circulates the lubricant through one or more components of the rotary engine 220 of the unit power system 530. As discussed, the unit lubrication system 324 includes the oil tank 282 and the oil pump 284, which for simplicity, are not shown in FIG. 8. It should be noted in certain embodiments, the oil tank 282 may be disposed external to the enclosure 502, and fluidly coupled to the enclosure 502 via a fluid fitting interface disposed between the mounting structure 700 and the enclosure 502.

The unit exhaust system 526 includes the outlet conduit 274, the exhaust muffler 276 and an enclosure exhaust duct 578. For simplicity, the outlet conduit 274 and the exhaust muffler 276 are not shown in FIG. 8. The enclosure exhaust duct 578 directs the exhaust flow from the exhaust muffler 276 out of the enclosure 502. In one example, the enclosure exhaust duct 578 is a tubular or cylindrical duct, which extends beyond the enclosure 502 and may be fluidly coupled to an exhaust duct 702 associated with the mounting structure 700.

The unit intake system 528 provides intake air into the enclosure 502. In one example, the unit intake system 528 includes an inlet 540. The inlet 540 is fluidly coupled to an intake duct 704 of the mounting structure 700 to receive air. In one example, the inlet 540 comprises an inlet duct, which extends beyond a perimeter of the enclosure 502. The inlet 540 is fluidly upstream from the radiator 296 such that air from the inlet 540, which is generally at a lower temperature than the air within the enclosure 502, may be drawn, by the cooling fan 298 (FIG. 2), through the radiator 296 to cool the fluid within the radiator 296.

In one example, the unit power system 530 includes the starter-generator controller 214 (FIG. 2), the rotary engine 220, the starter-generator 270 and the battery pack 286. In one example, the starter-generator controller 214 is electrically coupled to an electrical power interface 706 of the mounting structure 700, which in turn is electrically coupled to an interface 516 of the enclosure 502 to receive the electric power generated by the micro-auxiliary power unit 500. The starter-generator controller 214 is positioned external to the enclosure 502, and may be in communication with the interface 516 via a suitable wired connection. It should be noted in certain embodiments, the battery pack 286 may be disposed external to the enclosure 502, and electrically coupled to the enclosure 502 via the interface 516. In addition, the enclosure 502 may include a drain 562, which enables fluids collected within the enclosure 502 to be released from the enclosure 502. A suitable fluid fitting may be coupled to the drain 562, if desired, to provide a connection for a conduit for the fluid to drain out of the enclosure 502.

The rotary engine 220 is operable to generate torque, which drives the starter-generator 270 to generate electric power or energy that is output to the starter-generator controller 214. As discussed with regard to FIG. 2, the rotary engine 220 is a Wankel engine, which includes the throttle body 242, the air filter 244 and the heater 248. For simplicity, the throttle body 242, the air filter 244 and the heater 248 are not shown in FIG. 8. The throttle body 242 receives the air from the inlet 540 of the unit intake system 528. The rotary engine 220 also receives fuel from the unit fuel system 520. The rotary engine 220 also includes one or more spark coils 262. As discussed, the one or more spark coils 262 generate an electric spark to ignite the fuel, and the resulting combustion drives a rotor of the rotary engine 220. The rotor, in turn, drives the output shaft 220a. One end of the output shaft 220a is coupled to the starter-generator 270 to drive the starter-generator 270, and the other end of the output shaft 220a is coupled to the cooling fan 298. The starter-generator 270 receives the rotary power from the rotary engine 220 and generates electric power. The starter-generator 270 is electrically coupled to the interface 516, which may be electrically coupled to the starter-generator controller 214 that distributes the electric power to the aircraft bus 211 (FIG. 2).

In one example, the unit fire detection and suppression system 532 includes the one or more sensors 268, the suppressant valve 269, a suppressant supply interface 571 and the detection and suppression controller 273. For simplicity, the one or more sensors 268, the suppressant valve 269 and the detection and suppression controller 273 are not shown in FIG. 8. The one or more sensors 268 observe conditions within the enclosure 502 and generate sensor signals based on the observations, which are communicated to the processor 273a of the detection and suppression controller 273. The suppressant valve 269 is fluidly coupled between the storage tank 120a that stores the fire suppressant agent and the enclosure 502. One or more conduits 275, 277 may fluidly couple the storage tank 120a to the suppressant valve 269, and fluidly couple the suppressant valve 269 (FIG. 2) to the enclosure 502. The suppressant supply interface 571 fluidly couples the conduit 277 to the enclosure 502. The suppressant supply interface 571 may comprise a quick disconnect coupling, or other suitable coupling for fluidly coupling the conduit 277 to the enclosure 502. The suppressant supply interface 271 enables the fire suppression agent from the aircraft 102 to be quickly and easily fluidly coupled to the micro-auxiliary power unit 500.

As discussed with regard to FIG. 2, the detection and suppression controller 273 is located outside of the enclosure 502. In other embodiments, the detection and suppression controller 273 may be integrated with the micro-auxiliary power unit 500 inside the enclosure 502. The processor 273a of the detection and suppression controller 273 receives as input the sensor signals from the sensors 268. The processor 273a of the detection and suppression controller 273 determines, based on the sensor signals, whether a thermal event or fire is detected within the enclosure 502 as discussed with regard to FIG. 2. Based on the determination of a thermal event, the processor 273a of the detection and suppression controller 273 outputs one or more control signals to the fuel shut-off valve 182 to move the fuel shut-off valve 182 from the first, opened position to the second, closed position; and the processor 273a of the detection and suppression controller 273 outputs one or more control signals to the suppressant valve 269 to move the suppressant valve 269 from the first, closed position to the second, opened position (FIG. 2). Thus, the unit fire detection and suppression system 532 detects a thermal event within the micro-auxiliary power unit 500, the enclosure 502 contains the thermal event, and the unit fire detection and suppression system 532 extinguishes the thermal event.

The micro-auxiliary power unit 500 may be installed in any suitable location within the aircraft 102. In one example, the enclosure 502 may be provided with suitable enclosure mounts 604 to mount the micro-auxiliary power unit 500 as a unitary structure. In one example, the enclosure 502 includes at least three enclosure mounts 604a, 604b, 604c. One of the enclosure mounts 604a is coupled to a front of the enclosure 502, while the other two enclosure mounts 604b, 604c is coupled to each side of the enclosure 502. It should be noted that while the enclosure mounts 604a, 604b, 604c are shown as threaded cylindrical bolts, the enclosure mounts 604a, 604b, 604c may have any desired shape. Within the enclosure 502, the micro-auxiliary power unit 500 may include one or more engine mounts 606. The engine mounts 606 may be provided to support the rotary engine 220, as well as other components. The mounts 604a, 604b, 604c, 606 may also provide vibration isolation.

The mounting structure 700 removably couples the micro-auxiliary power unit 500 to the aircraft 102 (FIG. 1). Generally, the mounting structure 700 is permanently or fixedly attached to the aircraft 102. In one example, the mounting structure 700 is substantially U-shaped, and includes a first, rear panel 710, a second, bottom frame 712 and a pair of opposed side frames 714. The rear panel 710 is orientated substantially perpendicular to the bottom frame 712. The rear panel 710 includes a first panel portion 716 opposite a second panel portion 718. A cut-out 720 is defined between the first panel portion 716 and the second panel portion 718, and a bridge panel 722 may interconnect the first panel portion 716 and the second panel portion 718. The cut-out 720 reduces a mass of the mounting structure 700. The mounting structure 700 may be composed of suitable materials, including, but not limited to, metals, metal alloys or polymers. The mounting structure 700 may be cast, forged, additive manufactured, stamped, etc.

The exhaust duct 702 is disposed about an opening 716a defined through the first panel portion 716. The first panel portion 716 also includes a suppressant coupling 724. The suppressant coupling 724 fluidly couples the conduit 277 (FIG. 2) to the suppressant supply interface 571 of the enclosure 502. The suppressant coupling 724 may comprise a quick disconnect coupling, or other suitable coupling for fluidly coupling the conduit 277 or a fire suppressant agent to the enclosure 502. The suppressant coupling 724 enables the fire suppression agent from the aircraft 102 to be quickly and easily fluidly coupled to the micro-auxiliary power unit 500.

The intake duct 704 is disposed about an opening 718*a* defined through the second panel portion 718. The second panel portion 718 also includes the electrical power interface 706 and the signal interface 708. The electrical power interface 706 is coupled to the second panel portion 718 so as to provide electrical communication between the interface 516 of the micro-auxiliary power unit 500 and the starter-generator controller 214 (FIG. 2). The signal interface 708 is coupled to the second panel portion 718 so as to provide electrical communication between the signal interface 512 of the micro-auxiliary power unit 500 and the engine controller 210 (FIG. 2).

The bridge panel 722 defines a bore 722*a*. The bore 722*a* is sized to receive the mount 604*a*. In this example, the mount 604*a* may comprise a threaded bolt, which passes through the bore 722*a* and receives a mechanical fastener, such as a nut, to couple the micro-auxiliary power unit 500 to the mounting structure 700. It should be noted that other techniques may be employed to couple the micro-auxiliary power unit 500 to the mounting structure 700.

The bottom frame 712 is substantially rectangular, and is sized to support the micro-auxiliary power unit 500. The pair of opposed side frame 714 interconnect the rear panel 710 to the bottom frame 712. In one example, each of the side frames 714 include a bracket 730. Each of the brackets 730 define a slot 730*a*. The slot 730*a* is sized to receive a respective one of the mounts 604*b*, 604*c*. In this example, the mount 604*b* may comprise a threaded bolt, which passes through the slot 730*a* and receives a mechanical fastener, such as a nut, to couple the micro-auxiliary power unit 500 to the mounting structure 700. It should be noted that other techniques may be employed to couple the micro-auxiliary power unit 500 to the mounting structure 700.

Figure 8:
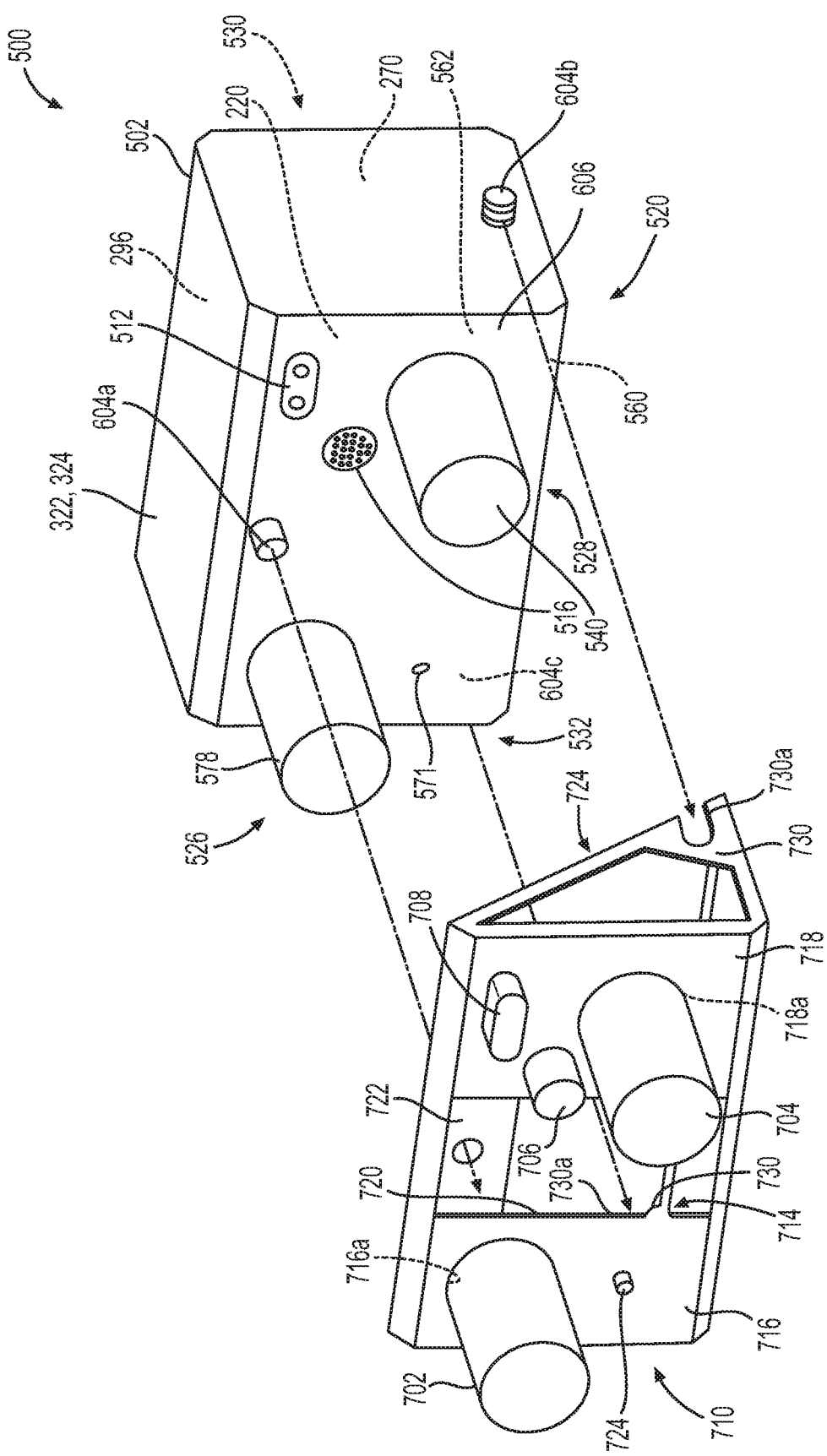
FIG. 8 is a partially exploded view of a micro-auxiliary power unit and a mounting structure for mounting the micro-auxiliary power unit within a vehicle, such as an aircraft, in accordance with various embodiments.

With reference back FIGS. 2 and 8, the micro-auxiliary power unit 500 can be assembled and coupled to the aircraft 102. In one example, the throttle body 242, the air filter 244, the fuel injector 258 and the heater 248 may be coupled to the rotary engine 220. The fuel line 252, the fuel filter 254 and the fuel pump 256 are coupled to the rotary engine 220, and the fuel line interface 260 is coupled to the fuel line 252. The outlet conduit 274 and the exhaust muffler 276 are coupled to the rotary engine 220. The starter-generator 270 is coupled to the output shaft 220*a* of the rotary engine 220, and the cooling fan 298 is coupled to the other side of the output shaft 220*a*. The battery pack 286 is coupled to the battery casing 288 and electrically coupled to the starter-generator 270. The starter-generator 270 is electrically coupled to the interface 516. The unit cooling system 322 and the unit lubrication system 324 are coupled to the rotary engine 220. The fuel pump 256, the fuel injector 258, the throttle body 242, the spark coils 262, the oil pump 287 and the coolant pump 294 are electrically coupled to the signal interface 512. The sensors 268 are positioned adjacent to the rotary engine 220. The enclosure 502 is positioned about the rotary engine 220, the starter-generator 270, the unit cooling system 322, the unit lubrication system 324, the portions of the unit fuel system 520 to enclose the micro-auxiliary power unit 500. The suppressant supply interface 571 is coupled to the enclosure 502. The fuel line interface 560 is coupled to the enclosure 502.

With the micro-auxiliary power unit 500 assembled, the micro-auxiliary power unit 200 is coupled to the aircraft 102. In one example, the micro-auxiliary power unit 500 is slid into the mounting structure 700 such that the mounts 604*a*, 604*b*, 604*c* are received within the respective one of the bore 722*a* and slots 730*a*. The mounts 604*a*, 604*b*, 604*c* are secured within the bore 722*a* and slots 730*a*, respectively, via nuts, for example. The enclosure exhaust duct 578 is coupled to or received within the exhaust duct 702. The inlet 540 is coupled to or received within the intake duct 704. The suppressant supply interface 571 is fluidly coupled to the suppressant coupler 724. The signal interface 512 is electrically coupled to the signal interface 708. The interface 516 is electrically coupled to the electrical power interface 706. The above process may be reversed to remove and replace the micro-auxiliary power unit 500 with a replacement micro-auxiliary power unit 500. During a removal and replacement, the mounting structure 700 remains coupled to the aircraft 102, and the exhaust duct 702, the intake duct 704, the electrical power interface 706, the signal interface 708 and the suppressant coupler 724 remain coupled to the appropriate systems of the aircraft 102.

As examples, the micro-auxiliary power units 200, 500 may have the following characteristics: a system weight of about 75 to about 100 lbs. (or lighter); a system reliability of approximately 1000-1500 hour between removals; and a performance of about 400 amps (A) at 28 volts (V), while typical electrical A/C systems are 150 to 300 amps. For aircraft integration, the micro-auxiliary power units 200, 500 is certifiable, and able to start and operate on aerospace kerosene fuels. The micro-auxiliary power units 200, 500 provide customer advantages of minimal maintenance, ease of removal and installation, standardized, minimal noise, simple interface and instructions, and dedicated power. In one embodiment, the micro-auxiliary power unit 200, 500 may have the following characteristics: a maximum revolutions per minute (rpm) of about 9,000 rpm (limited by the engine controller 210); maximum current of about 200 amps (A), which may be limited by an on-board circuit breaker; and/or a maximum coolant temperature of about 120° C. As a further example, the micro-auxiliary power unit 200, 500 may include the rotary engine 220 with a weight of approximately 15 pounds (lbs.), the starter-generator 270 with a weight of approximately 9 lbs., and control and management components with a weight of approximately 15 lbs. In one example, noise generation may be about 65 A-weight decibels (dBA) to about 70 A-weight decibels (dBA).

The micro-auxiliary power units 200, 500 provide a standardized product with minimal changes required for different applications, along with a simplified interface that is potentially not integrated into the avionics; simplified product support plan with replacements; and pre-positioned units to support operators with quick replacement units. The micro-auxiliary power unit 200, 500 integrate a non-gas turbine device into a single enclosure 202, 502 to perform the functions of continuous onboard power generation on the aircraft 102. The micro-auxiliary power units 200, 500 provide on-board power to the aircraft 102 to support air conditioning, power to the flight deck and cabin, insure the on-board batteries are sufficiently charged to assist main engine starting with additional power over and above the battery capability. The micro-auxiliary power units 200, 500 provide a power density at the system level of twice that of a traditional ground-based generators, while also meeting aerospace standards and maintaining cost targets.

The micro-auxiliary power units 200, 500 provide on-board power, which provides a number of advantages for the aircraft 102, including aircraft self-sufficiency, operational flexibility, and electrical capability for cabin and/or cockpit and main engine start assist, thereby providing efficiency (e.g., electrical assistance for main engine starting enhances main engine life), convenience (e.g., electrical power for cockpit/cabin preflight tasks), safety (e.g., system redundancy), and savings (e.g., significant fuel savings and cabin comfort vs main engine operation). Further, the micro-auxiliary power unit 200, 500 provide the following: operational assistance (e.g., self-reliance for secondary power, charges batteries, and assists main engine start); flight planning (e.g., run cockpit systems 45 minutes prior to departure, plan course without running main engine); increased aircraft value (e.g., sell or lease aircraft for increased value and/or increased value to passengers); more comfortable environment (e.g., control temperature inside cabin prior to passenger arrival; keep pilot and passengers comfortable while planning flights and preparing for departure); and fuel consumption and reliability (e.g., approximately 20% fuel burn of main engine; increase reliability of engines by running less while on ground). In addition, the micro-auxiliary power units 200, 500 provide a power source with high power/weight ratio, compact size, ability to run on heavy fuels (Jet-A, JP-4, JP-8), and full output capability on a hot day. The installation of the micro-auxiliary power units 200, 500 provide a small enclosure, light weight, and low noise relative to the main engine 110 (FIG. 1). In addition, the micro-auxiliary power units 200, 500 each provide a self-contained firebox that creates a fire zone having thermal event detection and suppression within the fire-proof or thermal resistant enclosure 202, 502, which simplifies installation of the micro-auxiliary power units 200, 500 into the aircraft 102.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

The control units, controllers, and functional units (generally, controllers) discussed above may be implemented may be implemented in various manners, such as in software on a processor, on a programmable chip, on an Application Specific Integrated Chip (ASIC), or as a hardware circuit. In some embodiments, the controllers are implemented in hardware on a dedicated circuit board located inside an Electronic Engine Controller (EEC) or an Engine Control Unit (ECU). In other embodiments, the controllers may be is implemented in a digital processor.

An example embodiment of a controller may be in the form of a computing device having, among other things, a processing unit and a memory which has stored therein computer-executable instructions. The processing unit may include any suitable devices to implement functions described herein such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may comprise any suitable machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally, such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory may include any storage means (e.g., devices) suitable for retrievably storing machine-readable instructions executable by processing unit.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A micro-auxiliary power unit for supplying electric power to a vehicle, comprising:
   a thermal resistant enclosure having an intake duct for receiving air;
   a source of fuel onboard the vehicle, the source of fuel fluidly coupled to the enclosure via a fuel line, with a fuel valve fluidly coupled to the fuel line upstream from the enclosure, the fuel valve movable between a first, opened position in which fuel flows through the fuel line and a second, closed position in which the flow of fuel is inhibited;
   a Wankel engine contained wholly within the enclosure, the engine configured to combust the air and the fuel to drive an output shaft;
   a starter-generator coupled to the output shaft of the engine and disposed wholly within the enclosure, the starter-generator configured to generate electric power for the vehicle based on the rotation of the output shaft;
   a cooling fan coupled to the output shaft;
   a detection and suppression system coupled to the enclosure, the detection and suppression system having at least one sensor disposed within the enclosure that observes a condition of the enclosure and generates sensor signals based thereon, and a controller having a processor configured to:

receive the sensor signals;
determine, based on the sensor signals, the presence of a thermal event within the enclosure; and
based on the determination of the presence of the thermal event, output one or more control signals to the fuel valve to move the fuel valve to the second, closed position.

2. The micro-auxiliary power unit of claim 1, wherein, based on the determination of the presence of the thermal event, the processor is further configured to output one or more control signals to a suppressant valve to supply a suppressant agent into the enclosure to extinguish the thermal event.

3. The micro-auxiliary power unit of claim 1, wherein the condition observed by the at least one sensor is at least one of a presence of smoke and a temperature within the enclosure.

4. The micro-auxiliary power unit of claim 1, wherein the enclosure defines a fire zone for the micro-auxiliary power unit.

5. The micro-auxiliary power unit of claim 1, further comprising a cooling system disposed within the enclosure, the cooling system including the cooling fan, a coolant pump for circulating coolant fluid and a radiator fluidly coupled to the intake duct and to the coolant pump, with the cooling fan, coolant pump and the radiator contained wholly within the enclosure.

6. The micro-auxiliary power unit of claim 1, further comprising an exhaust duct coupled to the engine to receive combustion products, the exhaust duct fluidly coupled to a muffler disposed within the enclosure, and the muffler is fluidly coupled to an enclosure exhaust duct to exhaust the combustion products from the engine external to the enclosure.

7. The micro-auxiliary power unit of claim 1, further comprising a lubrication system fluidly coupled to the engine, the lubrication system including a lubrication tank and a lubrication pump disposed wholly within the enclosure.

8. The micro-auxiliary power unit of claim 1, wherein the vehicle is an aircraft, the source of fuel is an aircraft fuel tank and the starter-generator is configured to supply the electrical power to one or more electrical loads of the aircraft.

9. The micro-auxiliary power unit of claim 8, further comprising a mounting structure fixedly coupled to the vehicle, the mounting structure configured to receive the micro-auxiliary power unit for electrically and fluidly coupling the micro-auxiliary power unit to the vehicle.

10. The micro-auxiliary power unit of claim 1, further comprising a fuel filter and a fuel pump fluidly coupled to the source of fuel downstream from the fuel valve, the fuel filter and the fuel pump contained wholly within the enclosure.

11. The micro-auxiliary power unit of claim 1, further comprising a battery pack configured to supply electrical power to the starter-generator to start the engine, the battery pack contained wholly within the enclosure.

12. The micro-auxiliary power unit of claim 1, wherein the enclosure includes at least one mount for removably coupling the enclosure to the vehicle, and the engine is mounted within the enclosure by at least one engine mount.

13. The micro-auxiliary power unit of claim 1, wherein the source of fuel is a source of jet fuel.

14. The micro-auxiliary power unit of claim 1, wherein the enclosure includes an interface for electrically coupling the electric power generated by the starter-generator to one or more electrical loads of the vehicle.

15. The micro-auxiliary power unit of claim 1, wherein the enclosure includes an interface configured to receive one or more control signals from an engine controller associated with the vehicle.

16. A micro-auxiliary power unit for supplying electric power to an aircraft, comprising:
a thermal resistant enclosure having an intake duct for receiving air, the enclosure defining a fire zone for the micro-auxiliary power unit;
a source of fuel onboard the aircraft, the source of fuel fluidly coupled to the enclosure via a fuel line, with a fuel valve fluidly coupled to the fuel line upstream from the enclosure, the fuel valve movable between a first, opened position in which fuel flows through the fuel line and a second, closed position in which the flow of fuel is inhibited;
a Wankel engine contained wholly within the enclosure, the engine configured to combust the air and the fuel to drive an output shaft;
a starter-generator coupled to the output shaft of the engine and disposed wholly within the enclosure, the starter-generator configured to generate electric power for one or more electrical loads of the aircraft based on the rotation of the output shaft;
a detection and suppression system coupled to the enclosure, the detection and suppression system having at least one sensor disposed within the enclosure that observes at least one of a presence of smoke and a temperature within the enclosure and generates sensor signals based thereon, and a controller having a processor configured to:
receive the sensor signals;
determine, based on the sensor signals, the presence of a thermal event within the enclosure;
based on the determination of the presence of the thermal event, output one or more control signals to the fuel valve to move the fuel valve to the second, closed position; and
based on the determination of the presence of the thermal event, output one or more control signals to a suppressant valve to supply a suppressant agent into the enclosure to extinguish the thermal event.

17. The micro-auxiliary power unit of claim 16, further comprising a cooling system disposed within the enclosure, the cooling system including a cooling fan coupled to the output shaft, a coolant pump for circulating coolant fluid and a radiator fluidly coupled to the intake duct and to the coolant pump, the cooling fan, coolant pump and the radiator contained wholly within the enclosure, and a lubrication system fluidly coupled to the engine, the lubrication system including a lubrication tank and a lubrication pump disposed wholly within the enclosure.

18. The micro-auxiliary power unit of claim 16, further comprising an exhaust duct coupled to the engine to receive combustion products, the exhaust duct fluidly coupled to a muffler disposed within the enclosure, and the muffler is fluidly coupled to an enclosure exhaust duct to exhaust the combustion products from the engine external to the enclosure.

19. The micro-auxiliary power unit of claim 16, further comprising a mounting structure fixedly coupled to the vehicle, the mounting structure configured to receive the micro-auxiliary power unit for electrically and fluidly coupling the micro-auxiliary power unit to the vehicle.

20. The micro-auxiliary power unit of claim 16, further comprising a fuel filter and a fuel pump fluidly coupled to the source of fuel downstream from the fuel valve, the fuel filter and the fuel pump contained wholly within the enclosure and a battery pack configured to supply electrical power to the starter-generator to start the engine, the battery pack contained wholly within the enclosure.

* * * * *